Nov. 14, 1961    H. L. MUELLER    3,008,770
RIM FOR TUBELESS BICYCLE TIRES
Filed Dec. 19, 1956    2 Sheets-Sheet 1

INVENTOR.
HOMER L. MUELLER
BY
Tennes J Erstad
Attorney ns patent office
3,008,770
Patented Nov. 14, 1961

3,008,770
RIM FOR TUBELESS BICYCLE TIRES
Homer L. Mueller, Rocky River, Ohio, assignor to American Machine and Foundry Company, a corporation of New Jersey
Filed Dec. 19, 1956, Ser. No. 629,278
3 Claims. (Cl. 301—97)

This invention relates to pneumatic wheels and rims and particularly to self sealing tubeless bicycle tires and rims therefor and the method of making the same.

Tubeless tires are presently used on automobiles and trucks but as far as known self sealing tubeless bicycle tires have never been provided for use on bicycles. One of the reasons why tubeless tires could not be readily employed on bicycle wheels has been due to the fact that the air would escape past the spoke tightening nipples which was not a problem in either the automobile or truck tire fields.

In the truck and automobile fields, the rim was made from an imperforate sheet of metal rolled into a circle of rim configuration and wherein only one hole for a valve stem was employed. Sealing this single hole against air leakage was a far simpler task than sealing the multitudinous spoke tightening nipple holes found in a bicycle rim.

The advantages of a tubeless tire were well known and the need existed for such a bicycle wheel which was not satisfied by the tube type tire currently employed on bicycle wheels and was not satisfied by the tubeless bicycle tire of several decades ago or the solid tire used prior to then. The single tube tire of several decades ago had the disadvantage that it had to be glued to the rim by an adhesive, and if any slippage occurred between the tire and the rim, it would tear the valve stem from the tire. The inner tube type tire that is in use today has the disadvantage that it is easily punctured and it is often difficult to locate a hole in a bicycle tube due to the tendency of the narrow diameter tube to form bubbles when inflated.

It was therefore necessary to provide a bicycle tire and rim which would overcome the disadvantages mentioned so as to enable bicycle users to enjoy the same advantages for their bicycles as was enjoyed by automobile and truck users employing tubeless tires.

It is therefore an object of the present invention to provide a self sealing tubeless bicycle tire.

Another object of this invention is to provide an improved rim which can be used with self sealing tubeless tires.

Another object is to provide a rim that can be used with either self sealing or tube type tires.

A further object is to provide a method of making wheels for tubeless tires.

A further object of this invention is to provide an improved rim for tubeless tires.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 1:
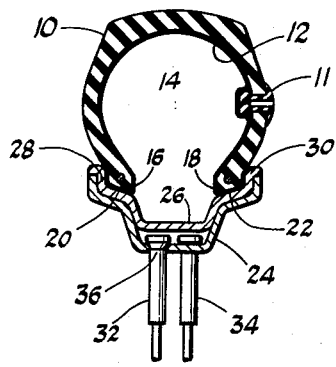
FIG. 1 shows a cross sectional end elevation of a bicycle wheel showing a dual rim construction.

In FIG. 1, I have shown a tubeless bicycle tire 10 in which the casing has been so constructed that it prevents air from leaking out from the center core 14 when the tire has been inflated. If desired, a self sealing feature may be incorporated directly into the walls of the casing or a conventional self sealing coating 12 can be placed on the inside of the casing to automatically seal any puncture in the casing.

The bicycle tire 10 is formed with a pair of beads 16 and 18 which form a tight tapered fit with the inclined tapered bead seats 20 and 22.

The rim is made up of two cylindrical sheet metal forms 24 and 26. The outer sheet metal form 26 has two tapered bead seat portions 20 and 22 and also a pair of flanges 28 and 30. The outer sheet metal form 26, as clearly shown in FIG. 1, does not contain any perforations through which air can escape so that when the reinforced tire beads 16 and 18 are firmly seated in place on the inclined tapered bead seats 20 and 22 up against the side flanges 28 and 30, no air can escape from the core 14 between the beads 16 and 18 and their respective bead seats 20 and 22.

The spoke nipples 32 and 34 are inserted through suitable holes 36 (only one of which is shown) formed in the second or inner rim 24 prior to the assembly of the inner rim 24 and the outer rim 26 into one integral unit. These nipples 32 and 34 are laced with their respective spokes and the inner rim is then trued prior to its assembly with the outer rim 26.

There is sufficient space for the head end of the nipples 32 and 34 to freely rotate in the space between the inner and outer rims 24 and 26 so as to enable the spokes to be further adjusted, if necessary, after the inner rim 24 and the outer rim 26 have been assembled into one integral unit.

One advantage of this design is that the inner rim has substantially the same configuration as the outer rim, and both tend to reinforce each other and thereby strengthen the entire integral rim assembly.

The upper edge of the flanges 28 and 30 is curled outwardly to provide a smooth surface to engage the tire casing when the tire has been inflated. The well or trough formed in the outer rim 26 immediately above the head end of the spoke nipples 32 and 34 is provided to facilitate mounting a tire on the inner rim 26.

The tire shown in FIG. 1 may be inflated in any conventional way. For example, a single hole (not shown) could be made through the trough section of the dual rims 24 and 26, into which would be mounted an air tight inflating valve (not shown) to permit the tubeless tire to be inflated when air pressure is applied to the center core of the tubeless tire.

If desired, no holes need be made in the tubeless tire rim since the inflation of the tire could be done by inserting an inflating needle through an inflating plug 11 mounted in the side wall of the tire casing 10, similar to those used for inflating basketballs and footballs and tires. If desired, an inflating plug 11, similar to that shown and described in U.S. Patent 2,183,900, granted Dec. 19, 1939, may be employed.

From the foregoing design, it will be apparent that no air can escape from the rim arrangement shown and the problems heretofore preventing the bicycle industry from obtaining the advantages of tubeless tire has now been eliminated.

I will now describe how the bicycle wheel and rim shown in FIG. 1 may be constructed.

The outer rim 26 may be made by rolling a strip of steel into the cross sectional configuration shown in FIG. 1. After this shaping operation, the formed strip steel is then cut off into lengths of predetermined size. The shaped cut-off length is then curled into a circle and butt-welded to form a tire rim.

Another way of making this rim is to butt-weld a flat band of metal to form a circle like a hoop and then to subject the welded hoop to a series of forming operations which may be done by either rollers or a series of pressing operations to form the cross sectional rim configuration shown by reference character 26 in FIG. 1.

Figure 9:
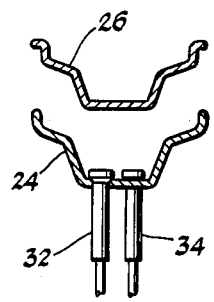
FIGS. 9 and 10 show one method of assembling the dual rim by shrinking the outside rim and sizing the edges of the inside rim against the outside rim to form a dual rim.
Figure 10:
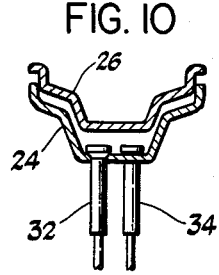

The inner channel 24 is assembled and joined with the outer rim 26 in the manner shown in FIGS. 9 and 10. The inner rim or channel 24 has the desired cross sectional configuration imparted thereto in a manner similar to that employed in making the outer rim 26. The principal difference being one of different dimensions, namely the inner channel 24 is of a sufficiently small diameter compared to the outer rim 26 that the inner rim 24 can be arranged concentrically inside the outer rim 26 as shown in FIG. 9.

Before the inner rim 24 is assembled with the outer rim 26 it is laced and trued. The outer rim 26 is then concentrically arranged with the laced and trued inner rim 24. The outer rim 26 is then subjected to a shrinking operation to shrink the outside rim 26, and bring it into close nesting arrangement as shown in FIG. 10. The inner rim 24 may have the sides thereof expanded to fit against the inside of the outer rim as shown in FIG. 1. It will be appreciated that if the outer rim 26 is of the correct size, the sides of the inner rim will have to be expanded, while if the outer rim 26 is oversized, it will have to be shrunk down to the correct size, and in the shrinking process, it will nest and seat itself on the inner rim or channel 24, thereby assuming the shape and configuration shown in FIG. 1. It will also be appreciated that both the inner rim 24 and the outer rim 26 can be made undersize and oversize respectively so that both rims are made to undergo a predetermined amount of shrinking and expanding to bring them to the correct size.

As mentioned above, the inner rim 24 is formed with a predetermined number of regularly spaced holes into which the spoke nipples 32 and 34 are inserted prior to the shrinking and expanding operations. What we have, therefore, is an outer rim which is secured onto a laced inner rim carrying the spoke nipples which are secured to spokes extending from the hub of the bicycle wheel. This laminated construction of a rim enables the outer and inner rims to be made of a lighter gauge metal than is normally employed in a rim because by joining the two formed rims together in laminated form, we obtain a reinforced and stronger rim than is achieved by a single strip of metal unless made of heavier gauge material.

Figure 11:
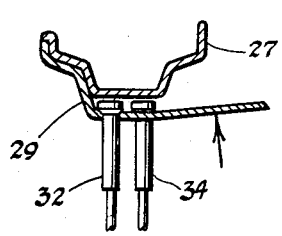
FIGS. 11 and 12 show another method of assembling the dual rim by pressing one side of the inside rim up against the outside rim to form a dual rim.
Figure 12:
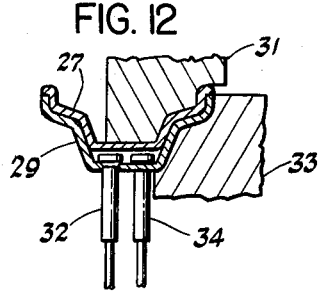

In FIGS. 11 and 12, I have shown another method for assembling the dual rim construction. In this case the outer rim 27 may be formed in the manner described above. The inner rim 29 is shaped in the manner shown in FIG. 11 so that one side has the cross sectional configuration which will enable it to nest with the outer rim 27 in the manner shown in FIG. 11.

The opposite side of the inner rim 29 has an unshaped diameter which is smaller than the inside diameter of the outer rim 27 so that the outer rim can be slipped over the opposite side of the inner rim 29 in the manner shown in FIG. 11.

The inner rim 29 is then subjected to a press operation between two pressing dies 31 and 33 to cause the unshaped side of the inner rim 29 to be given the configuration of the side of the outer rim 27 as shown in FIG. 12.

Figure 2:
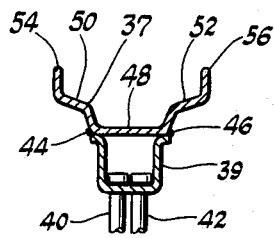
FIGS. 2 to 6 show various modifications of the rim structure shown in FIG. 1.

The embodiment of the invention shown in FIG. 2 differs from the structure shown in FIG. 1 in that the inner channel 39 does not overlap the outer rim 37 but is merely connected to the lower trough 48 by welding. The process of joining the inner channel 39 to the outer rim 37 may be similar to that described in regard to FIG. 1, if it is desired to overlap a portion of the sides of the trough 48.

However, the construction shown in FIG. 2 has the advantage that the shrinking and bulldozing operations referred to in FIG. 1 can be dispensed with. This is due to the fact that inner rim 39 of FIG. 2 is of slightly smaller diameter than the outer rim 37 so that the inner channel can be readily slipped inside the outer channel 37.

The channel 39 may be secured to the rim 37 in any suitable manner, as for example by welding or braising. In FIG. 2, I have shown how this can be done by welding beads 44 and 46. The rim in FIG. 2 is provided with a conventional trough 48, inclined tapered bead seats 50 and 52, and flanges 54 and 56. In the embodiment shown in FIG. 2, I have employed a conventional rim 37 which does not have any spoke perforations formed therein. This rim is of a configuration which will enable it to accommodate either tubeless or tube type tires.

A concentric inner channel 39, has perforations through which conventional spoke nipples 40 and 42 are inserted for lacing the spokes to form a wheel. This lacing and truing operation is done before the inner and outer rims are assembled into an integrated rim.

Since the holes formed in the trough of channel 39 do not extend through the rim 37, there is no possibility of air escaping from the inflated tubeless tire out through these holes. As just mentioned when the inner rim 39 is assembled with the outer rim 37, the inner rim has already been completely laced tying the rim 39 in with a hub by means of conventional spokes and nipples. Staggering the spoke nipples 40 and 42 along the circumference of the channel 39 facilitates the adjustment of the spokes to true the laced wheel.

Figure 3:
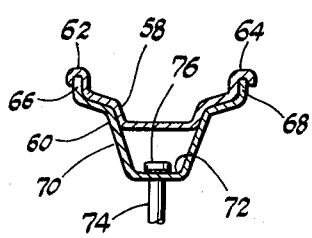

FIG. 3 shows another modified form of my invention wherein the outer rim 58 is partially supported by the inner rim 60 in the area where the rim has inclined tapered bead seats. The outer rim 58 has its external circumference 62 and 64 curled over the upwardly extending flanges 66 and 68 of the inner rim 70 thereby serving to hold the edges of the respective outer and inner rims 58 and 60 together.

The inner rim 60 is formed with a depressed pocket 72 which has a series of spoke tightening nipple holes formed therein through which the body of the nipple 74 can extend while the head of the nipple 74 is restrained from passing through the opening in the same manner as was shown in FIGS. 1 and 2.

The modification shown in FIG. 3 may be made in the manner described in connection with either FIGS. 9 and 10 or in the manner illustrated in FIGS. 11 and 12. In the latter case, the inner rim 60 is rolled and formed into the configuration shown in FIG. 11 so that the laced inner rim 60 can be slipped under the outer rim 58 from one side as shown in FIG. 11. It will be appreciated that before the rims are assembled as shown in FIG. 11, the inner rim 29 is completely laced with spokes as described in connection with FIGS. 1 and 2 and the outer rim is positioned in place over the inner rim or channel 70.

The side of the inner rim 70 over which the outer rim 58 is slipped into place is then subjected to a pressing operation bringing it into a close nesting fit with the outer rim 58 in the manner illustrated in FIG. 12. After this operation, the flanged portions 62 and 64 of the outer rim 58 are then either pressed or rolled to impart to them the configuration shown in Fig. 3.

Figure 4:
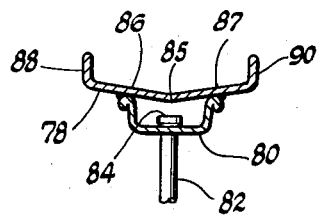

I have shown another embodiment of my invention in FIG. 4. In this case, I have shown an outer rim 78 with a configuration which is different from that shown in FIGS. 1 to 3. The inner rim is essentially a U-shaped channel 80 through which conventional spokes 82 extend through suitable openings. The spoke tightening nipples 82 are prevented from passing completely through the openings or holes formed in the channel 80 by their heads 84.

The embodiment shown in FIG. 4 may be made as follows. The outer rim 78 is made with a diameter which is slightly larger than the inner rim 80. The prelaced inner rim 80 is then placed inside the outer rim 78 and the outer rim 78 is then shrunk down by a radially inward pressing operation in a manner well known and presently followed in the manufacture of truck rims to assemble the inner and outer rims together as shown in FIG. 4, wherein the center of the outer rim is provided with a trough to facilitate mounting the tire.

This operation results in both rims being rendered immobile with respect to each other. For further security, these inner and outer rims may be braised at several points to prevent any movement between the two parts.

The embodiment in FIG. 4 shows an outer rim 78 which is of an extremely simple design and consists of a bottom area 85 having two oppositely tapered bead seats 86 and 87 and two flanges 88 and 90 against which the reinforced beads of the tire engage when the tubeless tire is inflated. The V-shaped bed 85 of the rim 78 facilitates mounting the tubeless tire and provides the maximum bead seat surface available for beads to seat themselves thereon.

Figure 5:
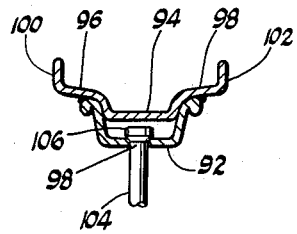

In FIG. 5, I have shown another embodiment of my invention wherein the inner channel 92 engages with the trough 94 of the outer rim. The outer rim has inclined tapered bead seats 96 and 98 and flanges 100 and 102 for supporting the beads of a tubeless tire. The trough 94 facilitates mounting the tire casing on the outer rim. The channel 92 has a plurality of nipple holes 98 through which the spoke nipples 104 extend. The head 106 of the spoke nipples 104 of course are sufficiently large so they cannot pass through the holes 98 formed in the inner channel 92. The inner rim 92 is prelaced before it is assembled with and secured to the trough 94 of the outer rim. The assembly of the outer rim with the inner rim shown in FIG. 5 may be accomplished in the same manner as described in connection with FIGS. 1 to 4.

Figure 6:
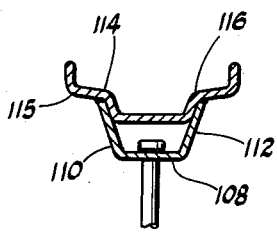

In FIG. 6, I have shown another version of the structure shown in FIG. 5 wherein the inner channel 108 is formed with straight flanges 110 and 112 which seat themselves evenly with the tapered portions 114 and 116 of the outer rim 115. The method of mounting the spokes and securing the inner channel to the outer rim may be the same as that described in connection with FIGS. 1 to 5.

In this case, the prelaced inner rim 108 has one side open to permit the outer rim 115 to be slid over the open side of the prelaced inner rim. The assembled wheel is then placed in a press and the open side 112 squeezed into the shape shown in FIG. 6 to form a bicycle wheel. After this, the two integrated rims may be seam-welded or braised together.

Figure 7:
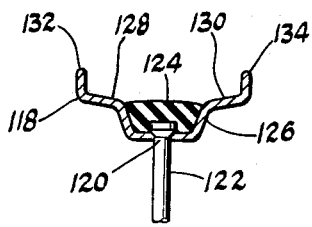
FIGS. 7 and 8 show a single rim construction wherein an air sealing element is superimposed over the rim trough.
Figure 8:

In FIG. 7, I have shown another modification of my invention wherein the rim 118 is provided with a plurality of holes 120 through which the spoke nipples 122 are inserted to form a laced wheel in the manner presently followed in making bicycle wheels.

A tapered sealing strip or band 124 which may be either rubber or plastic, is then inserted and cemented fast over the nipple heads around the circumference of the wheel. The sealing strip 124 effects an air tight seal with the trough 126 and prevents air from escaping out through the nipple holes 120. When the tubeless tire is inflated air pressure will further press the sealing strip 124 against the nipple heads thus making an air tight seal. The rim 118 is provided with tapered bead seats 128 and 130 and side flanges 132 and 134 for the reasons already discussed.

In the various embodiments shown and described above, applicant has provided a structure which enables self sealing tires which are of open type construction to be mounted on bicycle wheels in a manner similar to that employed on automobiles and trucks. The rim structure shown and described above embodies the necessary structural features necessary for connecting the rim to the hub of the wheel by means of conventional spokes and wherein means are provided which enable the spokes to be tightened or loosened to facilitate truing the wheel while still providing an air tight rim.

In addition, the structural embodiments of the applicant's apparatus shown in FIGS. 1 to 6 makes for a stronger rim because of its double channel arrangement which in effect results in a laminated type of structure, thus not only providing a rim which can be used for tubeless tires but also providing a stronger rim which, if desired, could be used with tube type tires.

The tubeless self sealing tires may be inflated by means of a conventional inflating stem extending through the trough of the outer rim or the tire may be inflated by means of a hollow needle inserted through a rubber valve mounted in the side walls of the tire.

It will be appreciated that while the rims described above are particularly well suited for use with tubeless tires, they can also be advantageously used with tube type tires.

While I have shown a tubeless tire mounted on a rim in FIG. 1, I have not shown a tubeless tire mounted on the rims in FIGS. 2 to 7 because the illustration in FIG. 1 is sufficient to show how the tire appears when mounted on any one of the rims disclosed in this application.

Figure 13:
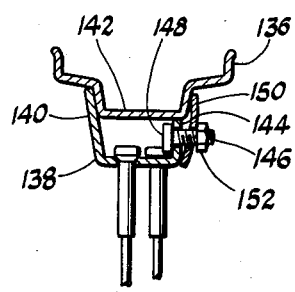
FIG. 13 shows an imperforate outer rim and a laced outer rim held together by clamps.

In FIG. 13, showing a modified form of rim, the outer rim 136 is mounted over the prelaced inner rim 138. The inner rim 138 has a flange 140 which engages with one side of trough and another flange 144 which is smaller in diameter than the trough 142. The flange 144 at spaced intervals has bolts 146 passing therethrough.

The head end 148 of bolts 146 are flat sided so they are prevented from turning by their engagement with the trough 142 and the inner rim 138.

A suitable spring washer 150 preferably of the lock type is placed over the bolt 146 on which is threaded the nut 152.

By tightening the nut 152, the washer squeezes against the side of trough pulling the inner rim 138 securely against the trough 142 of the outer rim.

In the embodiment shown in FIG. 13, it is possible to construct the inner flange 144 with an eccentric periphery so that one half of the outer rim will be covered by the flange 144. This construction will enable the inner rim to cover one half of the trough so that fewer nuts 152 will have to be used to secure the outer rim to the inner rim 138.

In the embodiment shown in FIG. 13, instead of employing individual washers 150, there could instead be employed a concentric ring (not shown) which extends all around the trough of the outer rim which has the advantage that it is more difficult for foreign matter to get inside of the inner rim 138 and provides a continuous covering which assists in securely fastening the outer rim to the inner rim.

Figure 14:
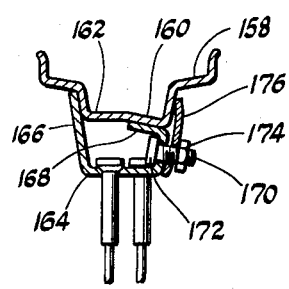
FIG. 14 shows an outer rim having a cam configuration on its inner periphery assembled with a laced inner rim both of which are joined together by clamping screws.

In the embodiment shown in FIG. 14, we have a further modification of the manner in which the outer and inner rim can be made detachable from each other. In this modification, the outer rim 158 has a cam surface 160 formed in the trough 162 to facilitate locking the outer rim against the inner rim 164.

The inner rim which is prelaced has a flange 166 which engages with one side of the trough 162. The other side of the inner rim 164 has a cam surface 168 which is adapted to engage with the cam surface 160 of the trough 162. The cam surfaces 168 and 160 are pulled together by means of a bolt 170, the head end of which 172 is mounted inside of the cam surface 168. When the nut 174 is tightened on the bolt 170, it squeezes against the washer 176, thereby pulling the inner and outer rim tightly together. The washer 176 may be either individual washers or a continuous ring of the type employed in FIG. 13.

The invention hereinabove described may be varied in construction within the scope of the claims, for the particular device selected to illustrate the invention is but one of many possible embodiments of the same. The invention, therefore, is not to be restricted to the precise details of the structure shown and described.

What is claimed is:

1. A bicycle wheel comprising an outer rim having tapered bead seats, flanges associated with said bead seats for limiting the outward movement of the beads of a tubeless tire, a tubeless tire mounted on said outer rim wherein the beads of said tubeless tire seat themselves on said tapered bead seats when the tubeless tire is inflated, means for inflating said tubeless tire for seating said beads on the tapered bead seats, the compressed air maintaining said beads up against the side flanges of said outer rim to form an airtight seal between the beads and the bead seats and flanges of said outer rim, an inner rim having a configuration tightly abutting said flanges and tapered bead seats of said outer rim, nipples extending through said inner rim, and bicycle spokes connected with said nipples to form a bicycle wheel.

2. The method of making a bicycle wheel which comprises forming an inner channel with a pocket of predetermined depth and having one side open, lacing said inner channel pocket with spokes to form a wheel, forming an outer channel to the shape of an imperforate tubeless tire mounting rim with a pocket of a depth which is less than that of the inner channel, said outer channel being large enough to slip over the open side of said inner channel, and mount on said laced inner channel, and pressing the side of said inner channel closed to firmly secure the inner channel and outer rim together while leaving a space between said pockets to thereby allow the displacement of the spoke ends therein.

3. The method of making tubeless tire rims for bicycles comprising forming an imperforate outer tubeless tire supporting rim with a shallow pocket, partially forming an inner laced channel with a pocket deeper than the shallow pocket, inserting the imperforate outer rim over the open side of the partially formed laced inner channel and subjecting the inner and outer channels to a pressing operation to squeeze both together to form a tubeless tire rim with both pockets spaced from one another.

References Cited in the file of this patent

UNITED STATES PATENTS

| | | |
|---|---|---|
| 224,215 | Newlin | Feb. 3, 1880 |
| 365,091 | Owen | June 21, 1887 |
| 383,129 | Jeffery | May 22, 1888 |
| 397,189 | Jeffery | Feb. 5, 1889 |
| 629,467 | Quintal | July 25, 1899 |
| 1,057,159 | Madsen | Mar. 25, 1913 |
| 1,830,444 | Pugh | Nov. 3, 1931 |
| 1,937,799 | Tarbox | Dec. 5, 1933 |
| 2,029,132 | Skelton | Jan. 28, 1936 |
| 2,057,628 | Gaenssle | Oct. 13, 1936 |
| 2,126,222 | Schwinn | Aug. 9, 1938 |
| 2,587,470 | Herzegh | Feb. 26, 1952 |
| 2,634,785 | Tubbs | Apr. 14, 1953 |
| 2,937,905 | Altenburger | May 24, 1960 |

FOREIGN PATENTS

| | | |
|---|---|---|
| 152,731 | Australia | Aug. 6, 1953 |